United States Patent [19]

Fromson et al.

[11] Patent Number: 4,507,349

[45] Date of Patent: Mar. 26, 1985

[54] SECURITY MEDIUM AND SECURE ARTICLES AND METHODS OF MAKING SAME

[75] Inventors: Howard A. Fromson, 15 Rogues Ridge Rd., Weston, Conn. 06066; Robert F. Gracia, Woodstock, Conn.

[73] Assignee: Howard A. Fromson, Weston, Conn.

[21] Appl. No.: 494,833

[22] Filed: May 16, 1983

[51] Int. Cl.³ .................... B32B 3/00; B32B 15/08; B32B 27/36; B41M 3/14

[52] U.S. Cl. ...................................... 428/195; 427/7; 427/131; 427/132; 427/331; 427/365; 427/402; 428/207; 428/209; 428/220; 428/457; 428/458; 428/900; 428/913; 428/916

[58] Field of Search .................. 427/7, 402, 365, 331, 427/131, 132; 428/195, 204, 209, 203, 458, 900, 913, 916, 457, 207, 220; 156/244.27; 8/471

[56] References Cited

U.S. PATENT DOCUMENTS

| | | | |
|---|---|---|---|
| Re. 28,506 | 8/1975 | Quanintance | 428/203 |
| 2,733,180 | 1/1956 | Pinto | 156/209 |
| 3,326,719 | 6/1967 | Beltzer et al. | 428/209 X |
| 3,363,557 | 1/1968 | Blake | 8/471 X |
| 3,707,346 | 12/1972 | Markert et al. | 8/471 |
| 3,809,568 | 5/1974 | Askew | 428/209 |
| 3,829,286 | 8/1974 | Anzai et al. | 8/471 |
| 3,919,447 | 11/1975 | Kilmer et al. | 428/203 X |
| 3,952,131 | 4/1976 | Sideman | 8/471 X |
| 3,984,598 | 10/1976 | Sarazin et al. | 428/209 X |
| 4,059,471 | 11/1977 | Haigh | 428/195 X |
| 4,121,003 | 10/1978 | Williams | 428/203 X |
| 4,178,404 | 12/1979 | Allen et al. | 428/209 |
| 4,183,989 | 1/1980 | Tooth | 427/7 X |
| 4,238,524 | 12/1980 | LaLiberte et al. | 427/7 |

*Primary Examiner*—Thomas J. Herbert
*Attorney, Agent, or Firm*—Felfe & Lynch

[57] ABSTRACT

A security medium, secure articles made therefrom and methods of making same. Articles are disclosed which are resistant to counterfeiting and unauthorized alteration and which are suitable for use as currency, securities, security passes, identification cards, and analogous items now usually manufactured on paper. The novel articles comprise two synthetic material layers with a barrier layer therebetween and an image formed from sublimatable dye within at least one of the synthetic layers.

19 Claims, No Drawings

SECURITY MEDIUM AND SECURE ARTICLES AND METHODS OF MAKING SAME

This invention relates to a new, longer-lasting and more secure medium for the production of currency, securities, tickets, indicia of personal identification or authority and other items now manufactured on paper and the like and which may have substantial face value and/or as to which it is desired to render forgery, unauthorized copying or duplication either prohibitively difficult or impossible.

Currency, bonds, stock certificates, employee identification cards, security passes and indicia of authority and the like have in the past been produced on paper or like material. Paper for such end uses is commonly known as security paper and typically includes within it one or more marker materials to render it unique and to impart to the paper some difficulty in terms of the unauthorized alteration or duplication of same. Such materials include colored particles, threads, metallized fibers and the like.

With respect to currency, paper money wears out relatively quickly. The usual method of increasing the wearability of paper money is to use high rag content paper. Generally, such money lasts only about six months in circulation before it must be replaced. The costs of continually monitoring, destroying, printing and replacing money in circulation is high. However, there is apparently resistance to change in currency, as is evident by the recent attempts by the United States government to put two-dollar bills and "silver" dollars into circulation. For psychological or other reasons, neither of these new currency forms were well received and were eventually withdrawn.

A security paper is disclosed in U.S. Pat. No. 4,247,318, issued Jan. 27, 1981 to Lee et al. This is basically a two-layer polyethylene film device within which a small amount of identifying material is embedded. The polyethylene layers are fused together to form a substantially monolithic stucture having high delamination resistance.

Various techniques are known for imaging wherein a dye or similar material sublimates, diffuses or otherwise transfers from an intermediate carrier to an imaged product under the influence of heat, light or similar energy. See, for example, U.S. Pat. Nos. 4,199,615 to Wackes et al.; 4,059,471 to Haigh; 3,829,286 to Anzai et al.; 3,792,968 to Rickenbacher et al.; and 3,484,342 to Blake et al.

Also known are various techniques for making metal-plastic laminates. See, for example, U.S. Pat. Nos. 4,178,404, to Allen et al.; 3,984,598 to Sarazin et al.; Re. 28,506 to Quaintance et al.; and 3,326,719 to Beltzer et al.

Various ways of encoding and/or protecting information by laminating have been disclosed. See, for example, U.S. Pat. Nos. 4,121,003 to Williams; 3,919,447 to Kilmer et al.; 3,809,568 to Askew; and 2,733,180 to Pinto.

The instant invention includes a new medium for the production of currency and the like which is secure, wear-resistant and long-lasting and which may optionally be provided with features to overcome psychological resistance to the introduction of currency made in accordance with the invention. Because the equipment required to manufacture the new security medium is relatively expensive and technologically complex, the likelihood of forgery and counterfeiting is reduced when compared to present practices, which permit passable counterfeiting via photolithography.

The security medium of the present invention comprises a first layer of a synthetic material, preferably a thermoplastic, an intermediate barrier layer and a second synthetic layer, also preferably a thermoplastic, fused together in a sandwich-like construction. The barrier layer is preferably, although not necessarily, opaque, and will resist or prevent the passage of sublimatable dyes therethrough. In certain embodiments of the invention, for example when articles according to the invention are utilized for currency purposes, the barrier layer preferably comprises one or more metals, either as free metal and/or as a metal compound.

Depending on the desired utility of finished articles as disclosed herein, the colors, types and thicknesses of the synthetic, preferably thermoplastic, layers may vary. Where, for example, one chooses to make currency, the layers of synthetic material should be relatively thin and flexible, so as to facilitate carrying on one's person, handling, folding and the like. If secure articles are desired for identification purposes, electronic "keys" or for tickets, however, it may be preferable for the layers to be thicker and less flexible, perhaps even rigid.

The barrier layer incorporated into the articles will substantially prevent the passage of sublimatable dyes therethrough. Optionally the barrier layer may function as a third information carrier, such as by permitting the magnetic encoding thereof, containing therein low energy isotopes, providing background coloration and/or including within it other visually and/or machine discernible indicia or information.

Synthetic materials useful in this invention must be receptive of and substantive to sublimatable dyes and include, for example, thermoplastics, such as polyamides, such as polyamide-6, polyamide-6,6 and polyamide-12; polycarbonates; aromatic polyesters, such as polymers of terephthalic acid and ethylene glycol or 1,4-dimethylcyclohexane; copolymers of terephthalic or isophthalic acid and ethylene glycol; acetates, such as cellulose triacetate and cellulose 2½-acetate; polyacrylonitrile, polyvinyls and copolymers thereof, such as acrylic esters, vinyl pyridine, acrylamides, vinylidene chloride or vinyl chloride; polyurethanes; polystyrenes; ABS; and copolymers of dicyanoethylene and vinyl acetate and acrylonitrile block copolymers. See, for example, U.S. Pat. Nos. 4,059,471; 3,829,286; 3,792,968; and 3,707,346. Any synthetic material, preferably a thermoplastic, which, under the influence of the heat and pressure conditions required for the particular sublimatable dye(s) utilized, will be permeable to the sublimated vapors and, upon cooling, entrap the dye(s) sublimated, will be useful.

Imaging materials useful in the practice of this invention include sublimatable dyes that will, under proper conditions of temperature and pressure, pass directly from the solid state to the vapor state without ever going through the liquid state. Temperatures will generally be in the range of about 140° F. to 500° F. and pressures in the range of about 1 to 10 psi, depending on the character of the material being worked with. Suitable materials have a sublimation half-life (the time required for one-half of a given amount of material to pass from the solid to the vapor state) in this temperature range of from about 0.5 to 75 seconds. The preferred temperature range is about 180° F. to 450° F. and the more preferred range is about 250° F. to 425° F.

Suitable sublimation materials are described in U.S. Pat. Nos. 3,363,557; 3,484,342; 3,707,346; 3,792,968; 3,829,286; 3,922,445; 3,952,131; and 4,059,471. See also American Dyestuff Reporter, Feb. 1975, at pages 23–35, 41, 43–50 and 52–56. A number of different colored dyes may be used at the same time to create a multi-colored or full-color design or image. Heat transfer dyes commonly used in dry heat transfer printing of textiles can be used. Many of these materials are known as disperse dyes, examples of which are as follows:

Disperse-type inks generally contain from 5–20% by weight disperse dye, preferably about 10%. Such inks are commercially available and the following, manufactured by Crompton and Knowles Corp. of Fair Lawn, N.J., U.S.A. are useful in practicing the invention:
Intratherm Yellow P-345NT
Intratherm Yellow P-340NT
Intratherm Yellow P-342
Intratherm Yellow P-343NT
Intratherm Yellow P-346
Intratherm Brilliant Yellow P-348
Intratherm Brilliant Yellow P-365
Intratherm Orange P-367
Intratherm Orange P-368
Intratherm Pink P-335NT
Intratherm Brilliant Red P-314NT
Intratherm Red P-334
Intratherm Red P-336
Intratherm Red P-339
Intratherm Scarlet P-355
Intratherm Scarlet P-358
Intratherm Violet P-344NT
Intratherm Blue P-304NT
Intratherm Blue P-305NT
Intratherm Blue P-306NT
Intratherm Brilliant Blue P-308
Intratherm Blue P-310NT New
Intratherm Dark Blue P-311NT
Intratherm Brown P-301
Intratherm Dark Brown P-303
Transfer Black XB-6
Transfer Black XB-8

Heat transfer dyes generally may be formulated into coatings containing from 5–20% by weight, preferably about 10% by weight, disperse dye and applied to a carrier such as paper, plastic or the like for laser transfer. Formulations based on conventional wet or dry toners can be used to form an image on a carrier using electrostatic copying techniques such as xerography, zinc oxide or charge transfer imaging. Toners containing 5–60% by weight disperse dye, preferably 10–40% by weight, may be employed.

Depending on the desired end use of articles described herein, either one or two synthetic receptor surfaces may be imaged with sublimatable dye(s). The design or image for each surface is preferably first put onto a carrier member. The image or design can be in one or more colors and can be deposited on the carrier in any number of conventional ways, including offset printing and electrostatic imaging such as xerography, zinc oxide imaging or charge transfer imaging utilizing an electrostatic toner composition containing a sublimatable dye. If the design or image to be sublimated onto the anodized aluminum contains words or symbols, a mirror image of the design or image is deposited on the carrier.

A laser transfer technique can also be used to transfer a sublimatable dye coated on a carrier to the receptor thermoplastic substrate. In this case, the sublimatable dye(s) would be coated over the entire surface of the carrier or it would be imprinted in the form of the desired image. The carrier is a laser transparent film coated or imaged with a dye that can be sublimated by laser imaging. If necessary or desired, oxidizable or explosive constituents may be used to encourage transfer or to alter the sensitivity of the laser responsive coating or image. Nitrocellulose, peroxides, oxides and nitrates are examples of such constituents. To transfer an image or selected portions of the dye coating to form the sublimated image in the receptor surface, a beam of energy from a laser which produces wave-lengths in the infrared region, such as a YAG (Yttrium-Aluminum-Garnet) laser, which has an effective wave-length of about 1.06 microns, or an argon laser, which has an effective wavelength in a range of from about 0.48 to about 0.52 microns, is focused by means known in the art through the laser transparent film to the interface between the dye coating and the thermoplastic polymer substrate. The energy provided by the laser beam causes the dye coating to sublimate, leaving a clear area on the laser transparent carrier film. The use of direct imaging techniques such as electrostatic imaging, as mentioned previously, and the use of laser imaging techniques have real advantages because they eliminate preprinting prior to transfer of the image or design to the receptor surface, thus permitting one step direct design or image transfer.

Carriers useful herein include any substrates that will not adversely interact with the sublimatable dye(s) and/or the thermoplastic receptor surface(s) during the transfer process, for example, by sticking to the receptor surface under the heat and/or pressure conditions accompanying image transfer. Alternatively, processes similar to those described in U.S. Pat. Nos. 3,860,388; 3,952,131; and 4,059,471 may be employed, wherein an intermediate transfer layer such as a polyolefin is interposed between the carrier and the receptor surface during image transfer to prevent adverse carrier-receptor surface interaction. In such an image-transfer process the sublimatable dye passes through the intermediate transfer layer to and into the thermoplastic receptor layer.

The barrier layer of the invention must be resistant or impermeable to the sublimatable dye(s) used in forming the image(s) on the article during and under the conditions of the image-transfer process used. Where both surfaces of the article are to be imaged, and especially where the synthetic utilized is not opaque, it is preferred that the barrier layer also be opaque, in order to ensure no visual interference of the image on one surface of the article by the image on the other side. In a preferred embodiment of the invention, the barrier layer comprises at least one metal. Although an article according to the invention may be formed by laminating three layers (two thermoplastic film layers with an intermediate metal layer, for example), such a process may be wasteful in terms of metal utilization for many applications of the invention. Preferred processes therefore comprise metallizing one surface of one of the thermoplastic layers and then laminating the metallized thermoplastic layer to the second thermoplastic layer.

Metallization of a thermoplastic substrate may be effected by any of the known processes for metallizing synthetics, including electroplating, electroless plating, roller coating, electron beam deposition and vacuum deposition via either evaporation or sputtering. Of these processes, deposition by electron beam or vacuum deposition by the evaporative or sputter coating methods are preferred. Where opacity and the appearance of free metal in an article according to the invention are desired, the requisite thickness of the metallized layer will vary from metal to metal. A minimum thickness of from about 200 to about 500 Angstroms will be necessary in most cases.

A preferred use of articles of the invention is for currency purposes. Currency made according to this disclosure may incorporate precious or other metals at reasonable cost and thereby surmount psychological resistance to new forms of currency, in that such currency would be perceived as having some, albeit minimal, inherent value due to precious metal content. Such currency would be inherently attractive, thin, light in weight, highly wear resistant and resistant to physical damage.

Preferred currency embodiments of the invention would comprise two outer layers of a relatively clear, flexible and rugged thermoplastic, for example a polyester, and between them a layer of a metal such as gold, silver, aluminum, copper, stainless steel, and chrome and the like. Were the appearance of a precious metal such as gold to be desired without the associated incremental expense, colored base metals such as aluminum could be utilized. Such metal layer need be only thick enough to provide acceptable metal coloration and function as a barrier layer. Optionally two layers of different metals or metallic compounds, or of the same metal but of different optical coloration, could be applied, one atop the other, such that upon lamination the finished laminate would present the appearance of one metal, for example silver, on one surface thereof and the appearance of a second metal, for example gold, on the other surface. Such multilayer metallization is well known in the arts such as in sputter coaters utilizing multiple targets in series or in evaporation vacuum coaters with a plurality of evaporative sources in series. The use of colored base metals in forming articles according to the invention may optionally involve metals or compounds of same that are colored throughout or such materials that have been surface colored via the art of conversion coatings or in other ways, resulting in the appearance of a bimetallic barrier layer while in fact employing what is in essence a single metallic composition.

In a preferred embodiment of the process disclosed herein, imaging of synthetic, e.g., receptor surfaces would await formation of, for example, a thermoplastic-metallized layer-thermoplastic fused sandwich or laminate. This is not necessary, however, inasmuch as the synthetic layers, thermoplastic or otherwise, could be imaged prior to metallizing and laminating, depending on the respective temperatures required for sublimation of the dye(s) forming the image and the physical conditions such as pressure and temperature attendant the lamination step.

An article according to the invention may also be provided with embossed features on one or both sides thereof. Where the synthetic material utilized is a thermoplastic, embossed areas may be provided in well-known ways under suitable temperature and/or pressure conditions, which will vary with the specific material utilized. The embossed areas may be correlated with an image in the material to provide an image in relief or be independent of an image in the material or be utilized without an image. In addition to an embossment functioning as still another indicia of authenticity and, in the case of currency or the like, another index or "fingerprint" of relative value, such three-dimensional markings would, in the case of currency, also provide the blind or visually impaired with at least a first-order means for distinguishing among various currencies.

Low energy isotopes with long half-lives could be incorporated into the metallized layer to serve as nonvisual but machine readable indicia of authenticity. Alternatively, or in addition to the foregoing, the metallized layer might be provided in part with, or entirely constituted of, magnetically codable and readable material, such as iron oxide, for example. If the invention were to be used for identification cards, security passes, "keys" for electronic locks and the like, this would permit periodic changes of encoded material by simply passing the article through a magnetic imprinter.

One or more of the above-described methods, i.e., particular metal, trace isotopes, magnetic encoding and the like may be utilized to unequivocally index currency and/or otherwise render articles according to the invention unique and difficult to forge or counterfeit. When combined with the visual designs or images which may be imparted to one or both thermoplastic receptor surfaces, such articles provide a more secure medium of exchange, identification and the like than prior art media.

Overal thicknesses of security media according to the invention may vary from as thin as permitted by relevant technology to as thick as desired for any specific application. Many synthetic materials such as thermoplastics are available in sheet form down to a 0.25 mil thickness. Since a suitable barrier layer may be achieved with a thickness on the order of hundreds of Angstroms, which is negligible when compared with the workable thickness of most synthetics, the state of the art as of the date of this invention would suggest a practical (but not theoretical) minimum thickness of about 0.5 mil for a security medium according to the invention. If an overall thickness similar to most papers typically used in applications calling for a security medium is desired, the medium of the invention should be provided with a thickness of from about 2 to about 8 mils, preferably from about 3 to 6 mils. Substantially thicker media for applications calling for less flexible articles (e.g., credit cards, cash transfer cards for automated tellers, security passes and the like) would ordinarily be preferred.

Where articles according to this invention are desirably relatively thick, so as to require or optionally comprise a barrier layer comprising, for example, a metallic layer of about 1 mil or thicker, aluminum may be used as the barrier layer or a portion of same and the invention disclosed in U.S. Pat. No. 4,201,821, issued May 6, 1980 to Fromson et al., may be employed. Articles so made would comprise an anodized aluminum barrier layer having a porous, unsealed anodic oxide layer provided with a polymeric coating over the oxide layer that is substantive to a sublimatable dye. This would permit the incorporation of a design or image via a sublimatable dye into the unsealed pores of the aluminum and the polymeric coating, providing an article comprising a design resistant to chemical or mechanical damage to the exterior polymer coating.

I claim:

1. A secure article resistant to counterfeiting and unauthorized alternation, said article comprising first and second layers of synthetic material, at least one of said layers being receptive of and substantive to sublimatable dye, a barrier layer intermediate to and contacting each of said first and second layers, said barrier layer being substantially impenetrable by sublimated dye under imaging conditions, and, within at least one of said first and second layers, an image comprising at least one sublimated dye.

2. A secure article according to claim 1 especially suitable for currency, wherein both said first and second layers are receptive of and substantive to sublimatable dye, said barrier layer is opaque and comprises at least one member selected from the group consisting of free metals and reacted metals, the total thickness of the article is from about 2 to about 8 mils, and there is an image comprising at least one sublimated dye within each of said first and second layers.

3. A secure article according to claim 1, wherein at least one of said first and second layers comprises an embossed outer surface.

4. A secure article according to claim 1, wherein said barrier layer comprises at least one member selected from the group consisting of free metals and reacted metals.

5. A secure article according to claim 4, wherein said barrier layer is magnetically encodable.

6. A secure article according to claim 4, wherein said barrier layer portion abutting said imaged layer comprises a layer of anodized aluminum having a porous, unsealed anodic oxide layer.

7. A secure article according to claim 1, wherein at least said imaged synthetic material layer comprises a thermoplastic material.

8. A secure article according to claim 7, wherein said thermoplastic material comprises a polyester.

9. A secure article resistant to counterfeiting and unauthorized alteration, said article comprising first and second layers of synthetic material, at least one of said layers comprising a thermoplastic material receptive of and substantive to sublimatable dye, a barrier layer intermediate to and contacting each of said first and second layers, said barrier layer being substantially impenetrable by sublimated dye under imaging conditions and comprising at least one member selected from the group consisting of free metals and reacted metals, and, within at least said layer comprising a thermoplastic material, an image comprising at least one sublimated dye.

10. A method of making a secure article resistant to counterfeiting and unauthorized alteration, said method comprising the steps of providing a security medium comprising first and second layers of synthetic material, at least one of said layers being receptive of and substantive to sublimatable dye, and a barrier layer intermediate to and contacting each of said first and second layers, said barrier layer being substantially impenetrable by sublimated dye under imaging conditions; and forming an image comprising at least one sublimated dye within said synthetic layer which is receptive of and substantive to sublimatable dye.

11. A method according to claim 10 comprising the additional step of embossing the outer surface of at least one of said synthetic material layers.

12. A method according to claim 10 especially suitable for making currency, wherein both said first and second layers are receptive of and substantive to sublimatable dye, said barrier layer is opaque and comprises at least one member selected from the group consisting of free metals and reacted metals, the total thickness of said first and second layers and said barrier layer is from about 2 to about 8 mils, and forming an image comprising at least one sublimated dye within each of said first and second layers.

13. A method according to claim 10, wherein said barrier layer comprises at least one member selected from the group consisting of free metals and reacted metals.

14. A method according to claim 13, wherein said barrier layer is magnetically encodable.

15. A method according to claim 13, wherein said barrier layer comprises a layer of anodized aluminum having a porous, unsealed anodic oxide layer.

16. A method according to claim 10, wherein at least one of said synthetic material layers comprises a thermoplastic material.

17. A method according to claim 16, wherein said thermoplastic material comprises a polyester.

18. A method of making a secure article resistant to counterfeiting and unauthorized alteration, said method comprising the steps of providing a security medium comprising first and second layers of synthetic material, at least one of said layers comprising a thermoplastic material receptive of and substantive to sublimatable dye, a barrier layer intermediate to and contacting each of said first and second layers, said barrier layer being substantially impenetrable by sublimated dye under imaging conditions and comprising at least one member selected from the group consisting of free metals and reacted metals; and forming an image comprising at least one sublimated dye within said layer comprising said thermoplastic material.

19. A method according to claim 18 comprising the additional step of embossing the outer surface of at least one of said synthetic material layers.

* * * * *